(12) United States Patent
Nyström et al.

(10) Patent No.: US 10,129,233 B2
(45) Date of Patent: *Nov. 13, 2018

(54) METHOD, DEVICE AND SYSTEM FOR NETWORK-BASED REMOTE CONTROL OVER CONTACTLESS SECURE STORAGES

(71) Applicant: NOKIA TECHNOLOGIES OY, Espoo (FI)

(72) Inventors: Sebastian Nyström, Espoo (FI); Lauri Pesonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,887

(22) Filed: Dec. 16, 2015

(65) Prior Publication Data
US 2016/0173474 A1 Jun. 16, 2016

Related U.S. Application Data

(63) Continuation of application No. 12/097,158, filed as application No. PCT/IB2005/003792 on Dec. 15, 2005, now Pat. No. 9,294,917.

(51) Int. Cl.
*G06F 7/04* (2006.01)
*H04L 29/06* (2006.01)
(Continued)

(52) U.S. Cl.
CPC .......... *H04L 63/08* (2013.01); *H04L 63/1416* (2013.01); *H04L 67/1097* (2013.01);
(Continued)

(58) Field of Classification Search
None
See application file for complete search history.

(56) References Cited

U.S. PATENT DOCUMENTS 5,552,897 A 9/1996 Mandelbaum et al.
5,774,546 A 6/1998 Handelman et al.
(Continued)

FOREIGN PATENT DOCUMENTS

EP 151277 A2 9/2004
EP 1503352 A1 2/2005
(Continued)

OTHER PUBLICATIONS

"Introduction to the NFC HAL API" Nokia. Jun. 2, 2010. Retrieved from the internet Jun. 2, 2010 <http://www.forum.nokia.com/info/sw.nokia.com/id/cc8feld0-3083-4f0c-908b-67d2alb9a06b/Introduction_to_the_NFC_HAL_API.html>.
(Continued)

*Primary Examiner* — Esther B Henderson
(74) *Attorney, Agent, or Firm* — Alston & Bird LLP

(57) ABSTRACT

A typical system environment comprises a terminal device, a secure storage subsystem, and an interconnectivity component. The terminal device has a network connectivity subsystem enabled for data connectivity with a wireless communications network. The secure storage subsystem has a secure storage memory for securely storing contents and is enabled for local RF connectivity through a local RF communication subsystem. The secure storage subsystem is operable as a contactless smartcard in accordance with any contactless technology. The interconnectivity component is adapted to enable communication of the secure storage subsystem through the network connectivity subsystem with the network. The interconnectivity component is further configured to detect that messages received from the network are destined for the secure storage subsystem and is configured to supply that identified messages to the secure storage subsystem. The messages enable exercising control over the secure storage subsystem in that the messages (Continued)

comprise one or more instructions to be processed by a secure memory controller of the secure storage subsystem.

20 Claims, 7 Drawing Sheets

(51) Int. Cl.
*H04W 12/06* (2009.01)
*H04L 29/08* (2006.01)
*H04W 88/06* (2009.01)

(52) U.S. Cl.
CPC ........... *H04L 67/125* (2013.01); *H04W 12/06* (2013.01); *H04L 63/0869* (2013.01); *H04W 88/06* (2013.01)

(56) References Cited

U.S. PATENT DOCUMENTS

| | | | |
|---|---|---|---|
| 6,250,557 | B1 | 6/2001 | Forslund et al. |
| 6,745,944 | B2 | 6/2004 | Dell |
| 6,934,855 | B1* | 8/2005 | Kipnis ............... G06Q 20/341 235/382 |
| 8,805,746 | B2* | 8/2014 | Hoffman ............... G06Q 20/04 455/558 |
| 2001/0039624 | A1 | 11/2001 | Kellum |
| 2002/0095587 | A1 | 7/2002 | Doyle et al. |
| 2003/0006280 | A1 | 1/2003 | Seita et al. |
| 2003/0218066 | A1 | 11/2003 | Fernandes et al. |
| 2004/0255081 | A1 | 12/2004 | Arnouse |
| 2005/0092830 | A1 | 5/2005 | Blossom |
| 2005/0125678 | A1 | 6/2005 | Shaw et al. |
| 2006/0065741 | A1 | 3/2006 | Vayssiere |
| 2006/0085848 | A1* | 4/2006 | Aissi .................... G06Q 20/341 726/9 |

FOREIGN PATENT DOCUMENTS

| | | |
|---|---|---|
| WO | WO 99/52066 A1 | 10/1999 |
| WO | WO 2004/012352 A1 | 2/2004 |
| WO | WO 2005/091997 A2 | 10/2005 |

OTHER PUBLICATIONS

Arnall, Timo, "Nokia 3220 with NFC". Dec. 6, 2005. Retrieved from the internet Apr. 15, 2016 <http://www.elasticspace.com/2005/12/nokia-3220-nfc>.
Calvet, J.C.L.; "The role of RFID in the mobile phone." Telektronikk; Telenor AS; Norway; No. 3; Apr. 1, 2005; pp. 131-142; XP002417982.
ETSI TS 102 412 V7.1.0, Smart Cards, Smart Card Platform Requirements Stage 1 (Release 7), Nov. 2005.
JSR 257 Expert Group, "Contactless Communication API." Retrieved from the internet Apr. 15, 2016 <http://jcp.org/en/jsr/detail?id=257>.
Open Mobile Alliance, DM Smart Card Requirements, Draft Version 1.0, Dec. 2005.
Office Action for Chinese Application No. 200580051975.6 dated Dec. 4, 2009, 37 pages.
Office Action for Chinese Application No. 200580051975.6 dated Apr. 28, 2010, 11 pages.
Extended European Search Report for European Patent Application No. 05 85 0696.5, dated Jun. 28, 2010.
Extended European Search Report for European Patent Application No. 05 82 0499.1, dated Jun. 17, 2011.
International Search Report and Written Opinion for International Application No. PCT/IB2005/003811 dated Jul. 10, 2006.
International Search Report and Written Opinion for International Application No. PCT/IB2005/003792 dated Oct. 4, 2006.
International Preliminary Report on Patentability, Chapter II, for International Application No. PCT/IB2005/003811 dated Jan. 16, 2008.
Non-Final Office Action for U.S. Appl. No. 12/097,158, dated Jun. 22, 2011, 9 pages.
Non-Final Office Action for U.S. Appl. No. 12/097,602, dated Sep. 15, 2011, 18 pages.
Final Office Action for U.S. Appl. No. 12/097,158 dated, Dec. 19, 2011, 11 pages.
Non-Final Office Action for U.S. Appl. No. 12/097,158, dated Apr. 23, 2014, 12 pages.
Final Office Action for U.S. Appl. No. 12/097,158, dated Oct. 23, 2014, 14 pages.
Non-Final Office Action for U.S. Appl. No. 12/097,158, dated Apr. 8, 2015, 13 pages.

* cited by examiner

Portable Terminal Device 100

METHOD, DEVICE AND SYSTEM FOR NETWORK-BASED REMOTE CONTROL OVER CONTACTLESS SECURE STORAGES

This application is a continuation of U.S. patent application Ser. No. 12/097,158, filed Jul. 22, 2008, which is a national stage entry of PCT Application No. PCT/IB05/03792, filed Dec. 15, 2005. The entire contents of each of these applications are incorporated by reference herein.

The present invention relates to the management of secure storages or smart storages. In particular, the present invention relates to remote management of secure storages such as smart cards applicable with contactless technology applications.

Contactless technology is a generic term for technologies using electromagnetic and/or electrostatic coupling technologies for low-power (LP), short-range (SR) radio frequency (RF) data communication services to offer security enhanced data communication features. Contactless technology is typically implemented on contactless smart chip technology, a specific form of smart card technology, which is used increasingly in applications handling with sensitive information. Contactless smart cards offer advantages to both the issuing organization as well as the cardholder. The issuing organization can support multiple applications on a single card and a variety of security policies for different situations. Typical applications are physical access control e.g., to a secured or monitored range, logical access control e.g., to networks, object and/or person identification, electronic payment, electronic ticketing, and logistic. In general, contactless smart chips have the ability to store, protect, manage, and provide access to sensitive information and to support security protocols and algorithms required by such application. The cardholder can take advantages of convenience, durability, and reliability provided by the contactless smart chip technology.

A contactless smart chip-based device includes an embedded secure microcontroller or equivalent intelligence, internal memory, and a small antenna, and communicates with a reader through a contactless radio frequency (RF) interface. The contactless interface provides users with the convenience of allowing the contactless device to be read at short distances with fast transfer of data. Contactless smart chip technology is available in a variety of forms—plastic cards, watches, key fobs, documents, and other handheld devices such as mobile phones.

The wide spread of mobile computing devices, in particular cellular terminal devices (cellular phones, smart phones, communicators), Personal Digital Assistants (PDAs) and related or similar consumer electronics, promotes the integration of contactless technology and in particular contactless smart chip technology into those mobile computing devices and in particular personal mobile computing devices which are conventionally carried along by consumers.

The mobile computing devices with integrated contactless technology offer input and output means, i.e., keys and keypad as well as display with user interface, which enable user exercised control over one or more individual application services operable with the contactless technology. However, it should be noted that the primary motive for integration is driven by the facts of usability, consumer convenience, handling expediency, and acceptance as well as single-homed multi-functionality promoting an aspired economic success of such mobile computing devices as well as contactless technology services.

Contactless technology as well as contactless smart chip technology has been developed as stand-alone technology. The contactless radio frequency (RF) interface enables for read and/or write access communication with the corresponding reader. Whereas the contactless technology implementation asserts of security, integrity, and authenticity aspects in access to a contactless smart chip and communication with a reader, the validity of the information obtained from a contactless smart chip has to be verified on reader side. The validity verification is conventionally performed by an on-line check against a data base of a service provider delivering validity confirmation. For instance in case of micro-payment applications (low price) or ticketing application (having a small value) on-line validity verification would cause costs which are incommensurate with such applications. Lacking validity verification represents a latent risk for all parties participating in the application service.

Moreover, inherent risks can also be identified in the field of identification and access control applications. In case of a loss of a contactless smart chip utilized for such applications, the cardholder is unable to prevent unauthorized use and a counter party may trust obtained card information by mistake.

An object of the present invention is to overcome the aforementioned implementation deficiencies, to which state of the art contactless technology implementations are subjected.

In particular, an object of the present invention is to enable a cardholder as well as a service provider to remotely exercise active and/or passive control.

The object of the present invention is solved by the features defined in the accompanying claims. According to an aspect of the present invention, a terminal device is provided. The terminal device comprises a network connectivity subsystem enabled for data connectivity with a wireless communications network, a secure storage subsystem having a secure storage memory for securely storing contents and enabled for local RF connectivity through a local RF communication subsystem, and an interconnectivity component which is adapted to enable communication of the secure storage subsystem through the network connectivity subsystem with the network. The secure storage subsystem is operable with any contactless technology, i.e., the secure storage subsystem interoperates with any external counterpart device as a contactless transponder. In particular, the external counterpart device may be capable for contactless connectivity, e.g., the external counterpart device may comprise a contactless reader, which communicates with the secure storage subsystem operable as a contactless smartcard. The interconnectivity component is configured to detect that messages received from the network are destined for the secure storage subsystem. Further, the interconnectivity component is configured to supply the messages to the secure storage subsystem. The messages enable exercising control over the secure storage subsystem in that the messages comprise one or more instructions to be processed by a secure memory controller of the secure storage subsystem.

According to another aspect of the present invention, a secure storage subsystem is provided. The secure storage subsystem comprises a secure storage controller adapted to operate the secure storage subsystem, a secure storage memory provided for secure storing of contents, and a local radio frequency connectivity subsystem arranged for local RF connectivity. The secure storage subsystem is operable as contactless smartcard. The secure storage controller is enabled for data communication with a wireless communications network through an interconnectivity component coupling the secure storage subsystem to a network connectivity subsystem enabled for data connectivity with the network. The secure storage subsystem receives messages from the network destined for the secure storage subsystem through the interconnectivity component. The messages enable exercising control over the secure storage subsystem in that the messages comprise one or more instructions to be processed by a secure memory controller of the secure storage subsystem. According to another aspect of the present invention, a system is provided. The system comprises a terminal device, a secure storage subsystem, and an interconnectivity component. The terminal device has a network connectivity subsystem enabled for data connectivity with a wireless communications network. The secure storage subsystem has a secure storage memory for securely storing contents and enabled for local RE connectivity through a local RF communication subsystem. The secure storage subsystem is operable as a contactless smartcard. The interconnectivity component is adapted to enable communication of the secure storage subsystem through the network connectivity subsystem with the network. The interconnectivity component is further configured to detect that messages received from the network are destined for the secure storage subsystem and is configured to supply those messages, which are identified to be destined to the secure storage subsystem, to the secure storage subsystem. The messages enable exercising control over the secure storage subsystem in that the messages comprise one or more instructions to be processed by a secure memory controller of the secure storage subsystem.

According to another aspect of the present invention, a method of network-based remote control over a secure storage subsystem is provided, which secure storage subsystem comprises a secure storage memory for securely storing contents and is enabled for local RF connectivity through a local RF communication subsystem. The secure storage subsystem is operable as a contactless smartcard. Messages are received at a network connectivity subsystem from a wireless communications network. The network connectivity subsystem is enabled for data connectivity with the network. The network messages are received at an interconnectivity component and those messages are identified which are destined for the secure storage subsystem. The identified messages are supplied to the secure storage subsystem. The messages are processed at a secure memory controller of the secure storage subsystem. The messages comprise one or more instructions enabling exercising control over the secure storage subsystem.

According to another aspect of the present invention, a computer program product is provided, which enables network-based remote control over a secure storage subsystem. The computer program product comprises program code sections for carrying out the steps of the method according to an aforementioned embodiment of the invention, when the program is run on a computer, a terminal, a network device, a mobile terminal, a mobile communication enabled terminal or an application specific integrated circuit. Alternatively, an application specific integrated circuit (ASIC) may implement one or more instructions that are adapted to realize the aforementioned steps of the method of an aforementioned embodiment of the invention, i.e., equivalent with the aforementioned computer program product.

For a better understanding of the present invention and to understand how the same may be brought into effect reference will now be made, by way of illustration only, to the accompanying drawings, in which.

Throughout the description below, same and/or equal components will be referred by the same reference numerals.

Throughout the following detailed description of embodiments of the present invention, the concept of the present invention will be described with reference to a cellular communication subsystem, which in particular supports GSM, GSM/GPRS, and/or GSM/EDGE, UMTS, and/or cdma2000, cellular communication. Moreover, the local radio frequency (RF) connectivity communication will be described with reference to specific implementation standards including in particular ISO/IEC 10536 (close coupling cards), ISO/IEC 14443 type A and type B (proximity cards), ISO/IEC 15693 (vicinity cards), ISO/IEC 18092 (Near Field Communication, NFC) standard, and EPC global standard. It should be noted that the aforementioned specifications of the cellular communication subsystem as well as the local radio frequency (RF) connectivity communication are embodied for the sake of illustration. The invention should be understood as not being limited thereto.

Originally, radio frequency identification (RFID) technology has been developed and introduced to identify objects and people. These applications range from tracking animals and tagging goods for inventory control and logistics to enabling fast payment and securely identifying people. While these applications all use radio waves to communicate information, the RF chip technology used for each is quite different, addressing the storage, range, and security requirements of a specific application. As a general definition, radio frequency identification (RFID) tag technology is used in applications that identify or track objects and contactless smart card technology is used in applications that identify people or store financial or personal information. A generic term of the overall technical field may be defined as contactless technology. Applications most often have differing requirements in their use of RF technology, with RFID transponders and contactless smart' card technologies providing very different capabilities. However, the basic data communication is based on the same physical data communication concept.

Figure 1:
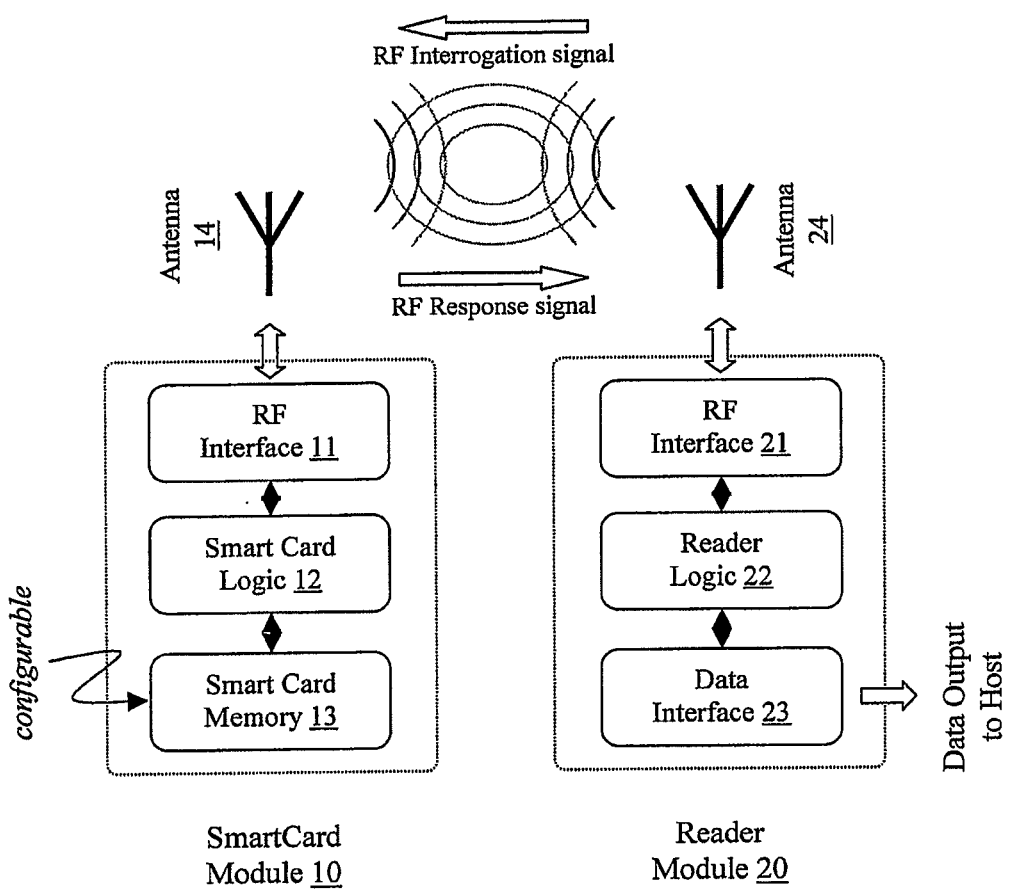
FIG. 1 illustrates schematically principle block diagrams depicting typical components of a contactless smartcard and a contactless reader subsystem.

A typical implementation of a state of the art radio frequency contactless smartcard is shown with respect to FIG. 1, which depicts a smart card module 10 for the sake of illustration. The typical smart card module 10 includes conventionally an electronic circuit, depicted exemplary as smart card logic 12, with data storage capacity, depicted herein as smart card memory 13, and a radio frequency (RF) interface 11, which couples an antenna 14 to the logic 12. Such RF-based contactless smartcards may be accommodated in small containers such as ISO standard cards (known from the form factor of credit cards), key fobs, modules, self-adhesive labels, paper tickets, and the like. Depending on the requirements made on envisaged applications of the contactless smartcards (i.e., data transmission rate, kind of energizing, transmission range etc.) different types are provided for data/information transmission at different radio frequencies within a range from several 10-100 kHz to some GHz.

Two main classes of contactless smartcard modules can be distinguished. Passive contactless smartcard modules are activated and energized by contactless reader modules, which generate an excitation radio frequency signal or interrogation radio frequency signal (continuous wave), for example a radio frequency (RF) signal at a predefined frequency. Active contactless smartcard modules comprise their own power supplies (not shown) such as batteries or accumulators for energizing. Moreover, it should be noted that hybrid implementations exist. One type of hybrid contactless smartcard module may comprise its own power source, which energizes the transponder logic 12 and/or memory 13, whereas the RF interface 11 is energized by an interrogation RF signal received from a contactless reader module. However, other types of hybrid contactless smartcard modules may be realizable.

Upon activation of a contactless smartcard by the means of a contactless reader module 20, the informational contents stored in the transponder memory 13 are modulated onto a radio frequency (RF) signal (i.e., the interrogation RF signal), which is emitted by the antenna 14 of the contactless smartcard module 10 to be detected and received by the contactless reader module 20. More particularly, in the case of a passive contactless smartcard module (i.e., without any local power source), the contactless smartcard module 10 is conventionally energized by a time-varying electromagnetic radio frequency (RF) signal (continuous RF wave) generated by the interrogating contactless reader module 20. When the radio frequency (RF) field passes through the antenna coil associated with the contactless smartcard module 10, a voltage is generated across the coil. This voltage is used to energize the contactless smartcard module 10, and enables back-transmission of information from the contactless smartcard module 10 to the contactless reader module 20, which is conventionally referred to as back-scattering.

In accordance with the application purpose of a contactless smartcard module 10, information or data stored in the transponder memory 13 may be either hard-coded or soft-coded. Hard-coded means that information or data stored in the transponder memory 13 is predetermined and unmodifiable. Soft-coded means that information or data stored in the transponder memory 13 is configurable by an external entity. The configuration of the transponder memory 13 may be performed by a radio frequency (RF) signal received via the antenna 14 or may be performed via a configuration interface (not shown), which allows access to the transponder memory 13.

A contactless reader module 20 typically comprises a RF interface 21, a reader logic 22, and a data interface 23. The data interface 23 is conventionally connected with a host system such as a portable terminal, which, inter alia, on the one hand exercises control over the operation of the contactless reader 20 by the means of instructions transmitted from the host to the reader logic 22 via the data interface 23 and on the other hand receives data provided by the reader logic 22 via the data interface 23. Upon instruction to operate, the reader logic 22 initiates the RF interface 21 to generate the excitation/interrogation signal to be emitted via the antenna 24 coupled to the RF interface 21 of the contactless reader module 20. In case that a contactless smartcard such as the contactless smartcard module 10 is within the coverage area of the excitation/interrogation signal, the contactless smartcard module 10 is energized and a modulated RF signal (back-scatter RF signal) is received therefrom. Particularly, the modulated RF signal carries the data stored in the transponder memory 13 modulated onto the excitation/interrogation RF signal. The modulated RF signal is coupled into the antenna 24, demodulated by the RF interface 21, and supplied to the reader logic 22, which is then responsible to obtain the data from the demodulated signal. Finally the data obtained from the received modulated RF signal is provided via the data interface of the contactless reader module 20 to the host system connected thereto.

The communication between contactless reader module and contactless smartcard module may comprise a simple response generated by the contactless smartcard module upon interrogation by the contactless reader module. In a more sophisticated manner, the communication between contactless reader module and contactless smartcard module may occur in a packetized manner, where one or more packets, each of which contains a complete command from the contactless reader module and a complete response from the contactless smartcard module. Typically, the command and response permit half-duplex communication between the contactless reader module and contactless smartcard module.

Depending on the requirements and/or complexity of the contactless application, the contactless technology is distinguished into radio frequency identification (RFID) technology and contactless smart card technology. For this reason, the term contactless smartcard should be understood as generic term including at least radio frequency identification (RFID) transponder, contactless smart cards and similar or like modules capable for contactless connectivity as defined in this application. The same definition will be used in relationship with counterpart devices capable for communication with the contactless smartcard, especially capable for reading access thereto. The term contactless reader should be understood as generic term including at least radio frequency identification (RFID) readers, contactless smart card readers and similar or like reader modules capable for contactless connectivity as defined in this application.

The term radio frequency identification (RFID) transponder is typically used to designate contactless smartcards, which are simple, low-cost, and disposable, and which are used for simple identification purposes (such as identifying animals), tracking goods logistically and replacing printed bar codes at retailers. Radio frequency identification (RFID) transponder modules include conventionally a chip that typically stores a static number, typically denoted as an identifier (ID), and an antenna that enables the chip to transmit the stored static number to reader modules. When the transponder module comes within range of an appropriate reader module, the transponder module is energized by the reader module's radio frequency field and transmits its identifier (ID) to the reader module. There is conventionally only little to no security provision on the radio frequency transponder module or during radio frequency (RF) communication with the reader module. Any reader module using the appropriate radio frequency (RF) signal, typically a RF signal having a predefined frequency, can initiate the radio frequency identification transponder to communicate its contents stored therein. Typical radio frequency identification (RFID) transponder module may be easily read from distances of several centimeters or inches to several meters or yards to allow easy tracking of goods and/or objects. RFID tags have common characteristics, including:

Low cost, high volume manufacturing to minimize investment required in implementation.

Minimal or limited security technology with radio frequency identification (RFID) transponder modules able to be read by any compatible radio frequency identification (RFID) reader module.

Disposable or one-time use.

Minimal or limited data storage capacity (comparable to bar code) usually a fixed format written once when the radio frequency identification (RFID) transponder is manufactured.

Read range optimized to increase speed and utility.

Contactless smart card technology is conventionally used in applications that need to protect personal information or deliver secure transactions. Contact smart card technology provides similar capabilities but does not have any radio frequency (RF) interface that allows contactless smart card modules to be conveniently read at a short distance from the smart card reader modules. Current and emerging applications using contactless smart card technology, include transit fare payment cards, government, and corporate identification cards, documents such as electronic passports and visas, and contactless financial payment cards. The contactless device typically includes a smart card secure component, or equivalent logics, and internal memory component and has the unique ability to securely manage, store, and provide access to data stored in the memory component, perform complex functions (for example, encryption or other security functions) and interact intelligently via radio frequency (RF) communication with an appropriate contactless reader module. Applications that require higher or highest degree of information and communications security (for example, payment applications, government identifications, electronic passports) use preferably contactless smart card technology based on international standards that limit the ability to read the contactless card module to approximately 10 centimeters (4 inches). Applications that need longer reading distances may use other forms of contactless technologies that can be read at longer distances.

Applications using contactless smart cards support many security features that ensure the integrity, confidentiality, and privacy of information stored or transmitted, including the following:

Mutual authentication: For applications requiring secure data access, a contactless smart card-based device may verify that the smart card reader module is authentic and may prove its own authenticity to the smart card reader before starting a secure transaction.

Strong information security: For applications requiring complete data protection, information stored in such smart card modules or documents using contactless smart card technology can be encrypted and RF communication between a contactless smart card-based device and a smart card reader module may be encrypted to prevent eavesdropping. Additional security technologies may also be used to ensure information integrity.

Strong contactless device security: Like contact smart cards, contactless smart card technology is extremely difficult to duplicate or forge and has built-in tamper-resistance. Smart card chips include a variety of hardware and software capabilities that detect and react to tampering attempts and help counter possible attacks.

Authenticated and authorized information access: The ability of contactless smart card module to process information and react to its environment allows the contactless smart card module to uniquely provide authenticated information access and protect the privacy of personal information. The contactless smart card can verify the authority of the information requestor and then allow access only to the information required. Access to stored information can also be further protected by a personal identification number (PIN) or biometric to protect privacy and counter unauthorized access.

Strong support for information privacy: The use of smart card technology strengthens the ability of a system to protect individual privacy. Unlike other technologies, smart card-based devices may implement firewall technology for an individual, releasing only the information required and only when it is required.

It is important to note, however, that information privacy and security must be designed into an application at the system level by the organization issuing the contactless smart card-based device, smart card module, or document. It is critical that issuing organizations have the appropriate policies in place to support the security and privacy requirements of the application being deployed and then implement the appropriate technology that delivers those features.

Those skilled in the art will understand on the basis of the aforementioned description that the fields of technology referred to above are not well separated. In view of future developments especially in the field of integrated circuit (IC) technology, radio frequency identification (RFID) technology and contactless smart card technology may converge; i.e., one or more specific features of today's contactless smart card technology such as production costs and storage capacity will be available at reasonable costs.

Currently, following typical frequencies are used in the field of contactless technology:

Low frequency range at less than 135 kHz, typically around 125 kHz;

High frequency range at around 13.56 MHz;

Ultra-High Frequency range (UHF)—in the range from 860 MHz to 960 MHz; and

Microwave frequency range at around 2.54 GHz ISM frequency band.

The 125 kHz contactless technology is used by the majority of today's radio frequency identification (RFID) transponder based access control system also called proximity access control systems). The 125 kHz contactless technology is based on de facto industry standards. One major de facto industry standard for 125 kHz technology access control systems. Typically, the 125 kHz contactless technology is a passive radio frequency communication technology because the radio frequency field emitted by a corresponding reader energized the logic of such a card.

The 13.56 MHZ contactless technology is standardized on the basis of several standards including especially ISO/IEC 14443, ISO/IEC 15693, and ISO/IEC 18092. These technologies are considered to satisfy application requirements for higher security, to accommodate multiple applications on a single smart card module implementation and to protect privacy aspects of cardholder information.

The 13.56 MHz technology conform to ISO/IEC 14443 standard is a contactless technology with a read range of up to approx. 10 centimeters (4 inches). This technology is originally designed for electronic ticketing and electronic cash. For these applications, short read ranges and fast transaction speeds are critical. The ISO/IEC 14443 standard includes two versions, type A and type B, with different modulation approaches. The key features of ISO/IEC 14443 standard include the operating frequency at around 13.56 MHz with a read/write range up to 10 centimeters and an ISO/IEC standard data rate of 106 Kbps (kilobit per second; kbits/s). In the meantime, ISO/IEC 14443 technology (A or B) is capable of 212 Kbps, 424 Kbps, and 848 Kbps; higher data rates are under discussion. The typical storage capacity is in a range from 64 bytes to 64 Kbytes. Security aspects are taken into consideration with implementations comprising wired logics enabling authentication mechanisms, microcontroller based logics enabling security mechanisms, and/or crypto coprocessor based logics enabling cryptographic mechanisms such as 3DES, AES, ECC, and RSA. The close proximity requirement to enable communication supports to prevent or at least limit unintended communication.

The 13.56 MHz technology conform to ISO/IEC 15693 standard is designed to operate at ranges of up to approx. 1 meter (3.3 feet). The specification is well suited for facility access control in buildings, where read ranges are set to for instance 10 to 15 centimeters (4 to 6 inches) for building doors, and for parking lot access systems, where read ranges can be set to higher ranges, making it unnecessary for drivers to extend an arm out of the car window. The key features of ISO/IEC 15693 standard include operating frequency at around 13.56 MHz, a read range up to approx. 1 meter (3.3 feet), a data rate of 26 Kbps and storage capacity including typically 1 Kbit (128 bytes), 2 Kbit (256 bytes), and 16 Kbit (2 Kbytes). Security aspects are considered on the basis of wired logic/memory-based only credentials enabling authentication and/or encryption mechanisms, mutual authentication between card and reader, and/or DES and 3DES data encryption implementation.

The ISO/IEC 18092 standard designed Near Field Communication (NFC) defines a protocol based on a wireless interface for enabling peer-to-peer communication. The interface operates at the 13.56 MHz radio frequency band and operating distances of approx 0 to 20 cm are realizable. Generally the Near Field Communication defines a reader-to-reader communication, which includes transponder-to-reader communication. The NFC protocol distinguishes between a communication Initiator, which initiates and controls the exchange of data, and a communication Target, which answers the request from the Initiator. NFC protocol also distinguishes between two modes of operation: active mode and passive mode. In Active mode both devices (Initiator and Target) generate their own RF field to carry the data. In Passive mode only one device (Initiator) generates the RF field while the other device (Target) uses load modulation to transfer the data. The application sets the initial communication speed at 106 Kbps, 212 Kbps, or 424 Kbps. Subsequently the application and/or the communication environment may require speed adaptation.

In the field of UHF, contactless technology is standardized on the basis of EPC global specification. The EPC global specification relates to Electronic Product Codes (EPC), which will replace the conventional bar codes for product labeling in the field of enable product chain management and logistics of goods. The UHF contactless technology enables reader distances up to several meters.

All these standards are distinguished by well-defined communication protocols, which typically comprise half-duplex communication. As aforementioned, the communication is typically based on one or more command and response exchanges through the RF interfaces.

It should be noted that the aforementioned enumeration of standards is given for the sake of illustration to enlighten the field of contactless technology and a selection of the multiple, various standards available in this field. Those skilled in the art will appreciate that the inventive concept is applicable with any available and/or future standard.

Figure 2:
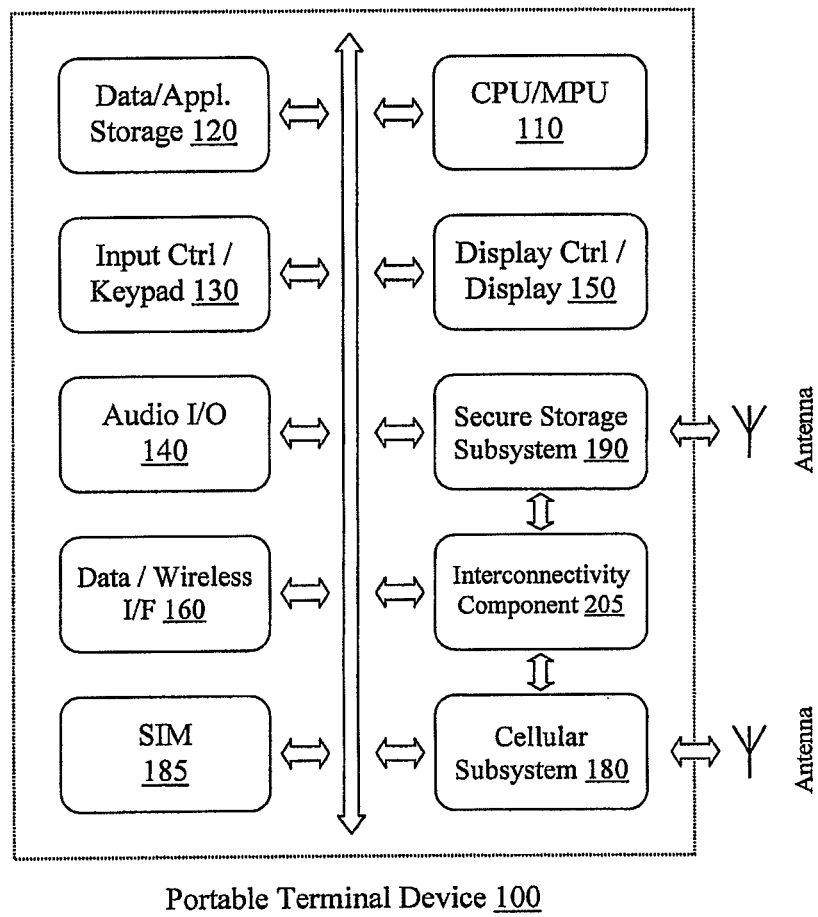
FIG. 2 illustrates schematically a principle block diagram of a terminal device enabled for network data connectivity and contactless local radio frequency (RF) communication according to an embodiment of the present invention.

FIG. 2 shows a schematic block illustration of components of a user terminal device in an exemplary form of a portable cellular communication enabled terminal 100. The terminal device 100 exemplarily represents any kind of processing terminal or device employable with the present invention. It should be understood that the present invention is neither limited to the illustrated terminal device 100 nor to any other specific kind of processing terminal or device.

As aforementioned, the illustrated terminal device 100 is exemplarily embodied as a cellular communication enabled portable user terminal with contactless secure storage capability. In particular, the terminal device 100 is embodied as a processor-based or micro-controller based system comprising a central processing unit (CPU) and a mobile processing unit (MPU) 110, respectively, a data and application storage 120, cellular communication means including cellular radio frequency interface (I/F) 180 with correspondingly adapted RF antenna (outlined) and subscriber identification module (SIM) 185, user interface input/output means including typically audio input/output (I/O) means 140 (conventionally a microphone and a loudspeaker), keys, keypad and/or keyboard with key input controller (Ctrl) 130 and a display with display controller (Ctrl) 150, and a (local) wireless and/or wired data interface (I/F) 160.

The operation of the terminal device 100 is controlled by the central processing unit (CPU)/mobile processing unit (MPU) 110 typically on the basis of an operating system or basic controlling application, which controls the functions, features and functionality of the terminal device 100 by offering their usage to the user thereof. The display and display controller (Ctrl) 150 are typically controlled by the processing unit (CPU/MPU) 110 and provide information for the user including especially a (graphical) user interface (UI) allowing the user to make use of the functions, features and functionality of the terminal device 100. The keypad and keypad controller (Ctrl) 130 are provided to enable the user inputting information. The information input via the keypad is conventionally supplied by the keypad controller (Ctrl) to the processing unit (CPU/MPU) 110, which may be instructed and/or controlled in accordance with the input information. The audio input/output (I/O) means 140 includes at least a speaker for reproducing an audio signal and a microphone for recording an audio signal. The processing unit (CPU/MPU) 110 can control conversion of audio data to audio output signals and the conversion of audio input signals into audio data, where for instance the audio data have a suitable format for transmission and storing. The audio signal conversion of digital audio to audio signals and vice versa is conventionally supported by digital-to-analog and analog-to-digital circuitry e.g., implemented on the basis of a digital signal processor (DSP, not shown).

The keypad operable by the user for input comprises for instance alphanumeric keys and telephony specific keys such as known from ITU-T keypads, one or more soft keys having context specific input functionalities, a scroll-key (up/down and/or right/left and/or any combination thereof for moving a cursor in the display or browsing through the user interface (UI), a four-way button, an eight-way button, a joystick or/and a like controller.

The terminal device 100 according to a specific embodiment illustrated in FIG. 4 includes the cellular communication subsystem 180 coupled to the radio frequency antenna (outlined) and operable with the subscriber identification module (SIM) 185. The cellular communication subsystem 180 may be also designed as cellular (communication) interface (I/F). The cellular communication subsystem 180 is arranged as a cellular transceiver to receive signals from the cellular antenna, decodes the signals, demodulates them, and also reduces them to the base band frequency. The cellular communication subsystem 180 provides for an over-the-air interface, which serves in conjunction with the subscriber identification module (SIM) 185 for cellular communications with a corresponding base station (BTS) of a radio access network (RAN) of a public land mobile network (PLMN). The output of the cellular communication subsystem 180 thus consists of a stream of data that may require further processing by the processing unit (CPU/MPU) 110. The cellular communication subsystem 180 arranged as a cellular transceiver is also adapted to receive data from the processing unit (CPU/MPU) 110, which is to be transmitted via the over-the-air interface to the base station (BTS) of the radio access network (RAN) (not shown). Therefore, the cellular communication subsystem 180 encodes, modulates and up-converts the data embodying signals to the radio frequency, which is to be used for over-the-air transmissions. The antenna (outlined) of the terminal device 100 then transmits the resulting radio frequency signals to the corresponding base station (BTS) of the radio access network (RAN) of the public land mobile network (PLMN). The cellular communication subsystem 180 preferably supports a 2nd Generation digital cellular network such as GSM (Global System for Mobile Communications) which may be enabled for GPRS (General Packet Radio Service) and/or EDGE (Enhanced Data for GSM Evolution; 2.5 Generation), a 3rd generation digital cellular network such as any CDMA (Code Division Multiple Access) System including especially UMTS (Universal Mobile Telecommunications System) also designated as WCDMA (Wide-Band Code Division Multiple Access) System and cdma2000 System, and/or any similar, related, or future (3.9 Generation, 4th Generation) standards for cellular telephony.

It should be understood that the cellular communication subsystem 180 may support cellular communication at multiple different frequency bands. For instance, the cellular communication subsystem 180 supports cellular communication at the frequency bands GSM 850, GSM 900, GSM 1800, and/or GSM 1900. Moreover, the cellular communication subsystem 180 may support cellular communication at multiple different protocols. For instance, the cellular communication subsystem 180 supports cellular communication according to the GSM standard and the UMTS standard or the GSM standard and the cdma2000 standard or any other combination thereof. The cellular communication subsystem 180 supporting cellular communication at multiple different frequency bands should be also designated as multi-band cellular communication subsystem 180, whereas the cellular communication subsystem 180 supporting cellular communication at multiple different protocols should be also designated as multi-mode cellular communication subsystem 180. Note that the cellular communication subsystem 180 may be a multi-band and multi-mode cellular communication subsystem 180.

The wireless and/or wired data interface (I/F) 160 is depicted exemplarily and should be understood as representing one or more data interfaces, which may be provided in addition to the above described cellular communication subsystem 180 implemented in the exemplary terminal device 100. A large number of wireless communication standards are available today. For instance, the terminal device 100 may include one or more wireless interfaces operating in accordance with any IEEE 802.xx standard, Wi-Fi standard, WiMAX standard, any Bluetooth standard (1.0, 1.1, 1.2, 2.0+EDR, LE), ZigBee (for wireless personal area networks (WPANs)), Infra-Red Data Access (IRDA), Wireless USB (Universal Serial Bus), and/or any other currently available standards and/or any future wireless data communication standards such as UWB (Ultra-Wideband).

The terminal device 100 comprising several communication interfaces including for instance a cellular communication interface 180, and one or more wireless communication interfaces 160 may be designed as multi-radio terminal device 100.

Moreover, the data interface (I/F) 160 should also be understood as representing one or more data interfaces including in particular wired data interfaces implemented in the exemplary terminal device 100. Such a wired interface may support wire-based networks such as Ethernet LAN (Local Area Network), PSTN (Public Switched Telephone Network), DSL (Digital Subscriber Line), and/or other available as well as future standards. The data interface (I/F) 160 may also represent any data interface including any proprietary serial/parallel interface, a universal serial bus (USB) interface, a Firewire interface (according to any IEEE 1394/1394a/1394b etc., standard), a memory bus interface including ATAPI (Advanced Technology Attachment Packet Interface) conform bus, a MMC (MultiMediaCard) interface, a SD (SecureData) card interface, Flash card interface and the like.

The terminal device 100 according to an embodiment of the present invention comprises secure storage subsystem 190 capable for contactless communication through a RF front-end interface coupled to a RF antenna (outlines). Reference should be given to FIG. 1 and the aforementioned description thereof, which illustrates the basic implementation and operation of contactless smartcard module 10. The secure storage subsystem 190 may be included in the terminal 100, fixedly connected to the terminal 100, or detachably coupled to the terminal 100. In particular, the secure storage subsystem 190 may be arranged on or in a cover of the terminal device 100, where the cover is preferably a detachable functional cover of the terminal device 100. In accordance with the inventive concept of the present invention, an interconnectivity component 205 is comprised by the terminal device 100. The interconnectivity component 205 is provided to enable connectivity between a network connectivity subsystem, herein the cellular communication subsystem 180, and the secure storage subsystem 190. Details about the specific implementation of the secure storage subsystem 190 and the interconnectivity component 205 will be presented below in detail.

The components and modules illustrated in FIG. 2 may be integrated in the terminal device 100 as separate, individual modules, or in any combination thereof. Preferably, one or more components and modules of the terminal device 100 may be integrated with the processing unit (CPU/MPU) forming a system on a chip (SoC). Such system on a chip (SoC) integrates preferably all components of a computer system into a single chip. A SoC may contain digital, analog, mixed-signal, and also often radio-frequency functions. A typical application is in the area of embedded systems and portable systems, which are constricted especially to size and power consumption constraints. Such a typical SoC consists of a number of integrated circuits that perform different tasks. These may include one or more components comprising microprocessor (CPU/MPU), memory (RAM:

random access memory, ROM: read-only memory), one or more UARTs (universal asynchronous receiver-transmitter), one or more serial/parallel/network ports, DMA (direct memory access) controller chips, GPU (graphic processing unit), DSP (digital signal processor) etc., The recent improvements in semiconductor technology have allowed VLSI (Very-Large-Scale Integration) integrated circuits to grow in complexity, making it possible to integrate all components of a system in a single chip.

Typical applications operable with the terminal device 100 comprise beneath the basic applications enabling the data and/or voice communication functionality a contact managing application, a calendar application, a multimedia player application, a WEB/WAP browsing application, and/ or a messaging application supporting for instance Short Message Services (SMS), Multimedia Message Services (MMS), and/or email services. Modern portable electronic terminals are programmable; i.e., such terminals implement programming interfaces and execution layers, which enable any user or programmer to create and install applications operable with the terminal device 100. A today's well established device-independent programming language is JAVA, which is available in a specific version adapted to the functionalities and requirements of mobile device designate as JAVA Micro Edition (ME). For enabling execution of application programs created on the basis of JAVA ME the terminal device 100 implements a JAVA MIDP (Mobile Information Device Profile), which defines an interface between a JAVA ME application program, also known as a JAVA MIDlet, and the terminal device 100. The JAVA MIDP (Mobile Information Device Profile) provides an execution environment with a virtual JAVA engine arranged to execute the JAVA MIDlets. However, it should be understood that the present invention is not limited to JAVA ME programming language and JAVA MIDlets; other programming languages especially proprietary programming languages are applicable with the present invention.

Figure 3A:
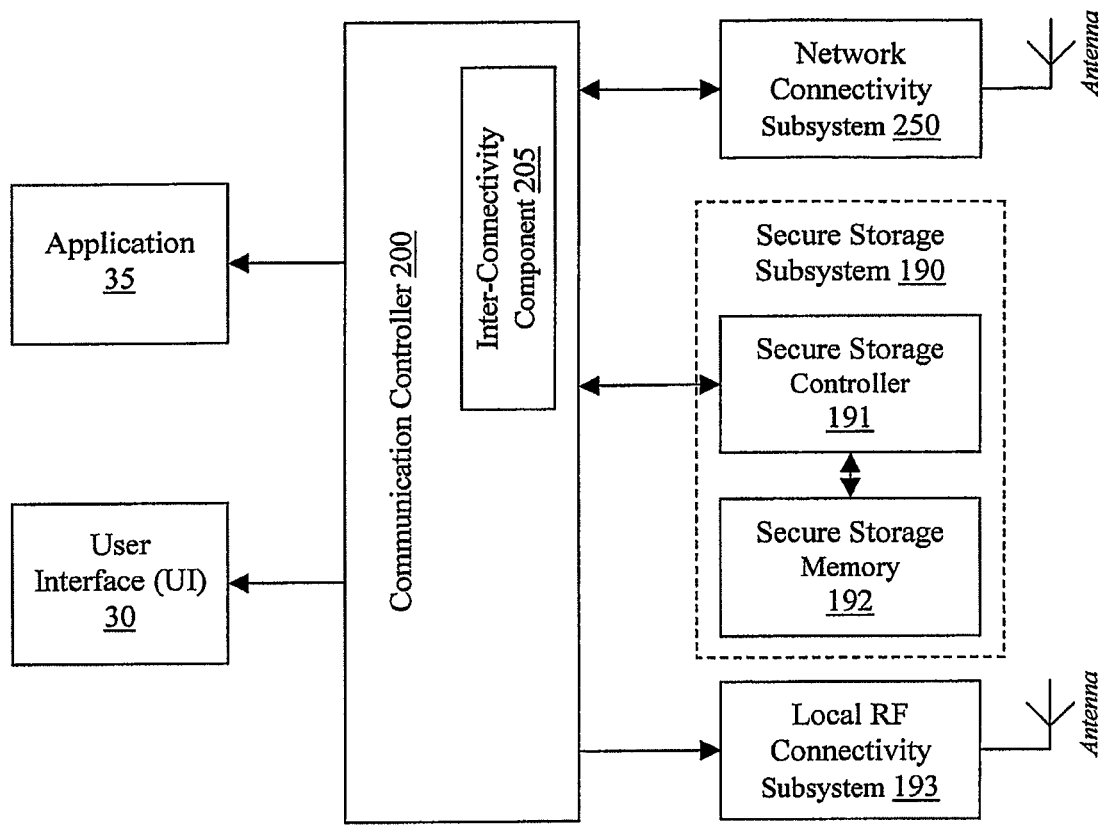
FIGS. 3a and 3b illustrate schematically further principle block diagrams of the terminal device of FIG. 2 enabled for networks data connectivity and contactless local radio frequency (RF) communication according to embodiments of the present invention.
Figure 3B:
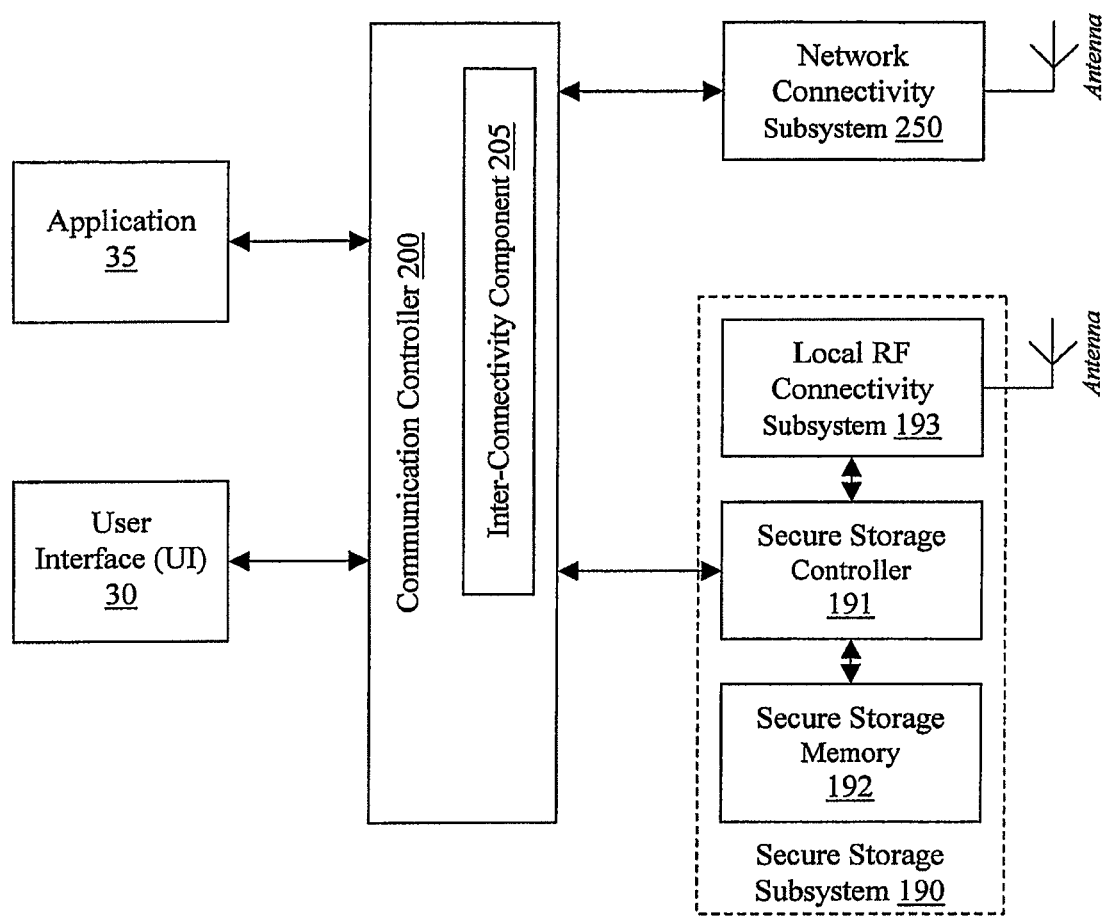

With reference to FIGS. 3a and 3b, schematic block diagrams or illustrated, which comprises principle structural components according to embodiments of the present invention.

The network connectivity subsystem 250 represents any data communication subsystem, in particular any of the aforementioned communication subsystems, wireless and/or wired data interfaces. The network connectivity subsystem 250 may be a cellular communication subsystem such as the cellular communication subsystem 180 described detailed with reference to FIG. 2.

Moreover, the network connectivity subsystem 250 may be a wireless communication subsystem such as the wireless data interface 160 or wired communication subsystem such as the wired data interface 160 both described detailed with reference to FIG. 2.

The secure storage subsystem 190 may be realized according to an embodiment of the invention on the basis of a secure storage memory 192 and a secure storage controller 191. The secure storage memory 192 is coupled through the secure storage controller 191 and a communication controller 200 to a separate local radio frequency (RF) connectivity subsystem 193, which enables for radio frequency communication with an appropriate contactless reader subsystem such as contactless reader module 20. Schematically, the secure storage subsystem 190 may be understood as comprising the local radio frequency (RF) connectivity subsystem 193. However, it should be noted that the local radio frequency (RF) connectivity subsystem 193 may or may not be included within the secure storage subsystem 190 including at least the secure storage memory 192 and the secure storage controller 191. In a general case, the local radio frequency (RF) connectivity subsystem 193 may be provided by the terminal device 100 and an interface (hardware and/or software interface, application program interface, and the like) is provided to interface communication between the secure storage subsystem 190 and the local radio frequency (RF) connectivity subsystem 193.

The secure storage subsystem 190 according to an embodiment of FIG. 3a should illustratively represent an integrated implementation on the basis of a secure storage memory 192. The secure memory 192 may be a specific storage memory component or may be a portion of a general storage memory. The secure storage memory 192 is preferably enabled for functionality known in the field of (contactless) smart card technology. The secure storage controller 191, which is preferably based on a software implementation eventually supported by mechanisms operable with hardware components (e.g., cryptographic engines), is adapted to provide an interface (preferably an application program interface, API) for controlling access to the secure storage memory as aforementioned with reference to the smart contactless technology. The access control includes in particular read access control, write access control, security mechanisms, authentication check mechanisms, integrity check mechanisms, and the like. The access control should meet the requirement issues of the application, for which the secure storage subsystem 190 is intended to be used.

Likewise, the secure storage subsystem 190 according to another embodiment of FIG. 3a should illustratively represent an implementation being based on a (contact) smart card. This means, the secure storage memory 192 as well as the secure storage controller 191 may be implemented on the basis of a smart card, which forms the secure storage subsystem 190. The smart card implements the aforementioned functionality, especially access control to the secure storage memory 192. The access control includes in particular read access control, write access control, security mechanisms, authentication check mechanisms, integrity check mechanisms, and the like. The access control should meet the requirement issues of the application, for which the secure storage subsystem 190 is intended to be used. The smart card, i.e., herein the secure storage subsystem 190 according to this embodiment, may be fixedly attached and connected to the terminal device 100 or may be detachably connected to the terminal device 100 providing a receptacle (not shown), such as a card slot, which is provided with a (physical) interface to enable connectivity between the terminal device 100 and an inserted smart card, which forms the secure storage subsystem 190. In general, the smart card (either fixedly or detachable connected) and the terminal device 100 are interconnected through a (physical) interface.

The capability of contactless communication as illustrated above with reference to the contactless technology is enabled through the local RF connectivity subsystem 193.

Alternatively, the secure storage subsystem 190 may be realized according to an embodiment of the invention of FIG. 3b on the basis of a contactless smart card which is conform to any contactless technology and/or standard thereof. The secure storage subsystem 190 includes a secure storage memory 192, a secure storage controller 191, and a local radio frequency (RF) connectivity subsystem 193, wherein the secure storage memory 192 is coupled through the secure storage controller 191 to an implemented local radio frequency (RF) connectivity subsystem 193, which enables for radio frequency communication with an appropriate contactless reader subsystem such as contactless reader module 20. The contactless smart card, i.e., herein the secure storage subsystem 190 according to this embodiment, may be fixedly attached and connected to the terminal device 100 or may be detachably connected to the terminal device 100, which provides a receptacle such as a card slot, which is provided with a (physical) interface to enable connectivity between terminal device 100 and contactless smart card forming the secure storage subsystem 190. Alternatively, the contactless smart card may be attached to or included in a detachable cover of the terminal device 100. In general, the contactless smart card and the terminal device 100 are interconnected through a (physical) interface.

It should be further noted that the secure storage controller 191 may be hardware and/or software implemented and is adapted to provide a hardware and/or software (application program) interface for controlling the access to the secured storage memory including in particular read access, write access, security mechanisms, authentication check mechanisms, integrity check mechanisms, and the like. In general, the secure storage controller 191 is primarily configured to enable the security functionality of the secure storage subsystem 190.

In principle, it should be understood that independent of the detailed implementation according to any of the aforementioned embodiments according to the present invention the secure storage subsystem 190 with the local radio frequency (RF) connectivity subsystem 193 is capable of representing and acting as a contactless smartcard module 10 in view of any external contactless reader such as contactless reader module 20. The secure storage controller 191 operates the secure storage specific functionality, in particular the secure storage controller 191 may be a management application performing the secure storage specific functionality, which is preferably implemented on the basis of hardware and/or stored in the secure storage memory (representing secure memory). The secure storage controller 191 may comprise a secure storage operating system, in particular a card operating system (OS). In general secure storage or secure memory should be understood to designate a memory being based on any storage technology which is capable to store data contents, which access (read and/or write access including modifying and deleting) is subjected to access policies defined by the application, with which the data contents is applicable.

The communication controller 200 is adapted to control operations of the data communication subsystems of the terminal device 100, in particular to exercise control of the network connectivity subsystem 250 and the local radio frequency (RF) connectivity subsystem 193.

Depending on implementation details of the secure storage subsystem 190, the control over the local radio frequency (RF) connectivity subsystem 193 may be directly exercised or may be exercised through the secure storage controller 191.

The local radio frequency (RF) connectivity subsystem 193 is adapted to operate radio frequency (RF) communication on the basis of contactless technology. In particular, the local radio frequency (RF) connectivity subsystem 193 is adapted to operate radio frequency (RF) communication in accordance with any current available or future contactless technology standard including especially ISO/IEC 14443A (Mifare), ISO/IBC 14443B, ISO/IEC 15693, and/or ISO/IEC 18092 (NFC, FeliCa).

More particularly, the communication controller 200 is adapted to interoperate with the secure storage controller 191 of the secure storage subsystem 190. The communication controller 200 and in particular a interconnectivity component 205, which may be part of the communication controller 200 or which may be provided as a separate component in association with the communication controller 200 enables data exchange between the network connectivity subsystem 250 and the secure storage subsystem 190 operated by the means of the secure storage controller 191.

In view of typical use cases including electronic ticket applications such as electronic commuter ticket applications, identification application, electronic access control applications, electronic payment applications such as electronic prepaid payment applications, electronic credit card applications, electronic membership identification applications, point card application, check-in and/or mileage services applications various security requirements have to be met including especially integrity and authenticity of contents relating to one or more of the aforementioned applications, (read and/or write) access control to contents, tamper-proof of contents, secured communication of contents with reader-based counterpart devices such as ticket gates or points of sales. These issues relating to security requirements are realized on the basis of the secure storage controller 191 and pre-defined security policies. The application related contents and security policies are stored in the secure storage memory 192 of the secure storage subsystem 190. It should be noted that in general contents and security policies relating to several applications may be stored in the secure storage memory 192.

Conventionally, secure storage subsystem 190 is provided by card issuers or application service providers with pre-defined application related contents and predefined security policies. Moreover, the secure storage subsystem 190 may store application related code sections including program code for being executed e.g., by the secure storage controller 191 and/or the terminal device 100. The application related code sections enable, when executed by the secure storage controller 191 and/or the processor 110 of the terminal device 100, the data communication of the secure storage subsystem 190 with reader-based counterpart devices in accordance with the application for which the secure storage subsystem 190 is destined. Further, the secure storage subsystem 190 may store application related code sections including user interface definitions enabling displaying of one or more user interface elements to a user by the display 150 of the portable terminal 100. The user interface elements are provided to the user to control the operation of the secure storage subsystem 190 and especially the secure storage controller 191 thereof including especially initiating of an application related data communication of the secure storage subsystem 190 with reader-based counterpart devices. In view of the aforementioned capabilities of the terminal device 100, the application related code sections, i.e., program code and/or user interface definitions, may be provided on the basis of JAVA MIDlets executable with a virtual JAVA engine.

Conventionally, modifications on the data stored in the secure storage subsystem 190 such as entering additional credit into an account maintained by electronic prepaid payment application or electronic wallet application, loading electronic tickets into an electronic ticket application, loading access control information into electronic access control application, identification information into an electronic identification application is, if at all, performed via the radio frequency interface established by the local radio frequency (RF) connectivity subsystem 193 and in accordance with the access policies defined.

The integration of a secure storage technology with a portable terminal 100 having network connectivity enables advantageously provision of additional data connectivity through the network connectivity subsystem 250 of the portable terminal 100. This additional data connectivity enables access to the secure storage subsystem 190. It should be noted that in view of the concept of the secure storage subsystem 190 provisions have to be taken which meet the security requirements thereof. The following description illustrates the concept of the present invention.

In general, the basic concept of the present invention enables application service providers and/or network operators to exercise control over the secure storage subsystem 190 and in particular over the secure storage controller 191, the contents stored in the secure storage memory 192, the application related security policies, and/or the application related code sections including program code and/or user interface definitions.

Figure 4A:
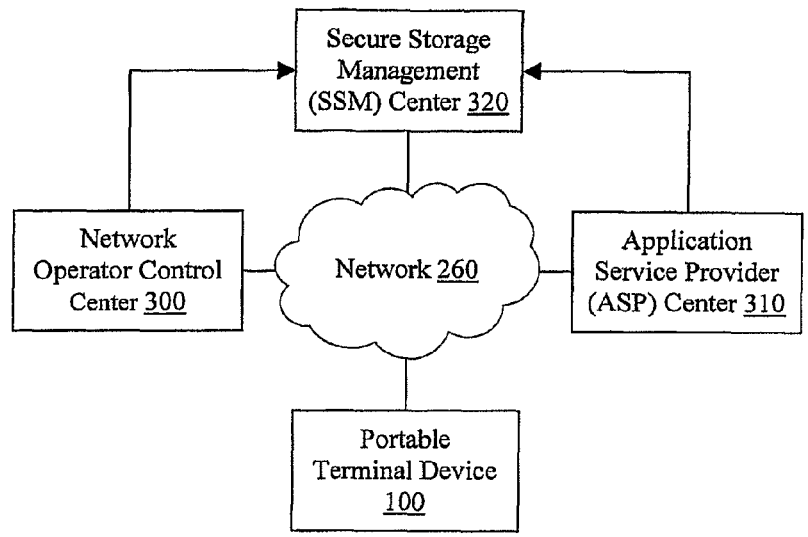
FIGS. 4a and 4b illustrate schematically principle block diagrams of system arrangements according to embodiments of the present invention.

With reference to FIG. 4a, a block diagram is predicted, which schematically illustrates network entities which may be included in a system environment according to an embodiment of the present invention. In general, the control is exercise through the network 260 to which the terminal device 100 is connectable via the network connectivity subsystem 180. The network 260 may be a public land mobile network (PLMN), a cellular network including in particular any type of GSM network, any type of CDMA (Code Division Multiple Access) network such as a UMTS (Universal Mobile Telecommunications System) network or cdma2000 network, a wireless data network including in particular a WLAN (wireless local area network), a Wi-Fi network, a WiMAX network, a WPAN (Wireless Personal Area Network), a Bluetooth network or a UWB (Ultrawide Band) network, a wire-based network including in particular a LAN (Local Area Network), a PSTN (Public Switched Telephone Network), DSL (Digital Subscriber Line), the Internet and/or any combination thereof.

The exercise of control over the secure storage subsystem 190 as described above is naturally strictly limited due to security requirement issues. Consequently, only distinct trusted network entities which are in knowledge of highly sensitive information required for the exercise of control should be applicable in accordance with the concept of the present invention. Especially, the application service provider (ASP) may operate its own ASP center 310 connected to the network 260 to exercise control, the network operator may be capable by the means of a network operator control center 300 for exercising control and/or a designated secure storage management (SSM) center 320 operated by the application service provider (ASP) and/or the network operator may be provided to allow exercising control.

Figure 4B:
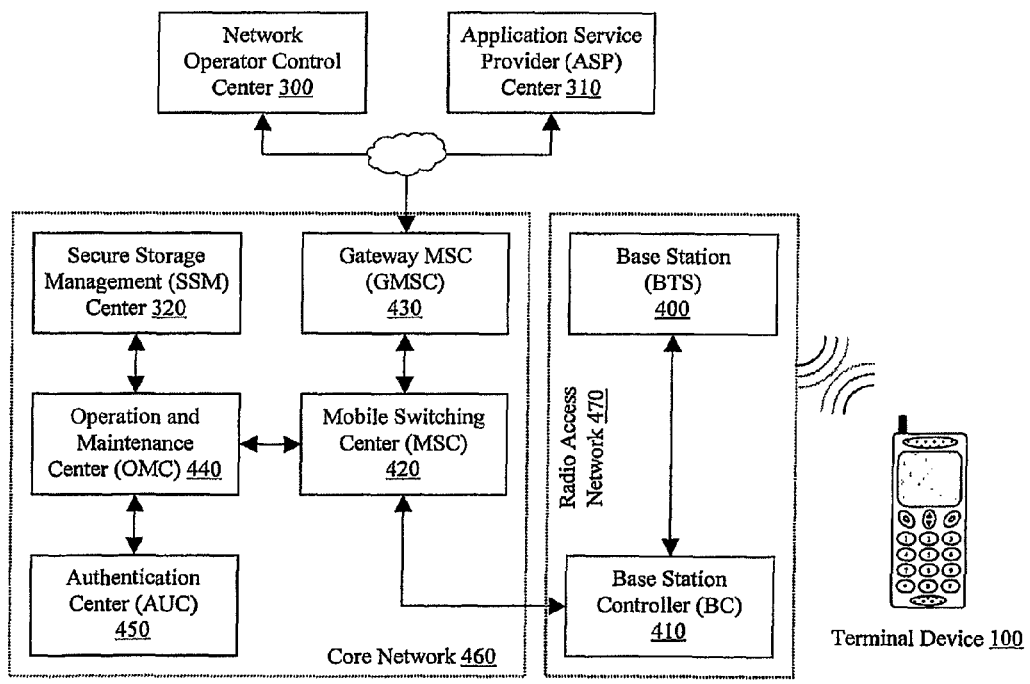

With reference to FIG. 4b, a block diagram is depicted, which schematically illustrates a system environment on the basis of a GSM Public Land Mobile Network (PLMN) environment according to a specific embodiment of the present invention. It should be noted that the present invention is not limit to any specific system implementation; in particular the present invention is not limited to that specific system environment illustrated in FIG. 4b. The system environment embodied in FIG. 4b is illustrated and described for the sake of completeness and illustration.

The GSM PLMN comprises typically a Radio Access Network (RAN) 470 comprising one or more Base Station Controller (BC) 410 each being connected to one or more Base Stations (BTS) 400, each in turn spanning a coverage area within which one or more terminal devices 100 communicate with the respective Base Station (BTS) 400 through an air (radio frequency) interface. The Radio Access Network (RAN) is connected to the Core Network (CN) 460 comprising inter alia a Mobile Switching Center (MSC) 420 connected to the Mobile Switching Center (MSC) 420, a Gateway Mobile Switching Center (GMSC) 430 providing connectivity to further networks including especially PSTNs (Public Switched Telephone Networks), external PLMNs (Public Land Mobile Networks) and the Internet, as well as a Operation and Maintenance Center (OMC) 440 operable with Operation and Maintenance Subsystem (OMSS) functions. The Operation and Maintenance Center (OMC) 440 is conventionally connected to an Equipment Identity Register (EIR) (not shown) and an Authentication Center (AUC) 450 supporting the Operation and Maintenance Subsystem (OMSS) operation.

According to the specific embodiment of FIG. 4b, the Secure Storage Maintenance (SSM) Center 320 arranged as a part of the Core Network (CN) 460 and connected to the Operation and Maintenance Center (OMC) 440. The Application Service Provider (ASP) Center 310 as well as the Network Operator Control Center 300 is connected via any network(s) to the Gateway MSC 430 of the Core Network 460. In a GPRS-enabled and/or EDGE-enabled GSM PLMN the Application Service Provider (ASP) Center 310 as well as the Network Operator Control Center 300 may be connected through a Gateway GPRS Support Node (GGSN) (not shown) and a Serving GPRS Support Node (SGSN) (not shown) to the Core Network (CN) 460. The Gateway GPRS Support Node (GGSN) (not shown) and the Serving GPRS Support Node (SGSN) enable for packetized data communication. It should be noted that arrangement of the Application Service Provider (ASP) Center 310, the Network Operator Control Center 300, and/or the Secure Storage Maintenance (SSM) Center 320 is illustratively and the present invention is not limited thereto.

Verification Procedure

Figure 5A:
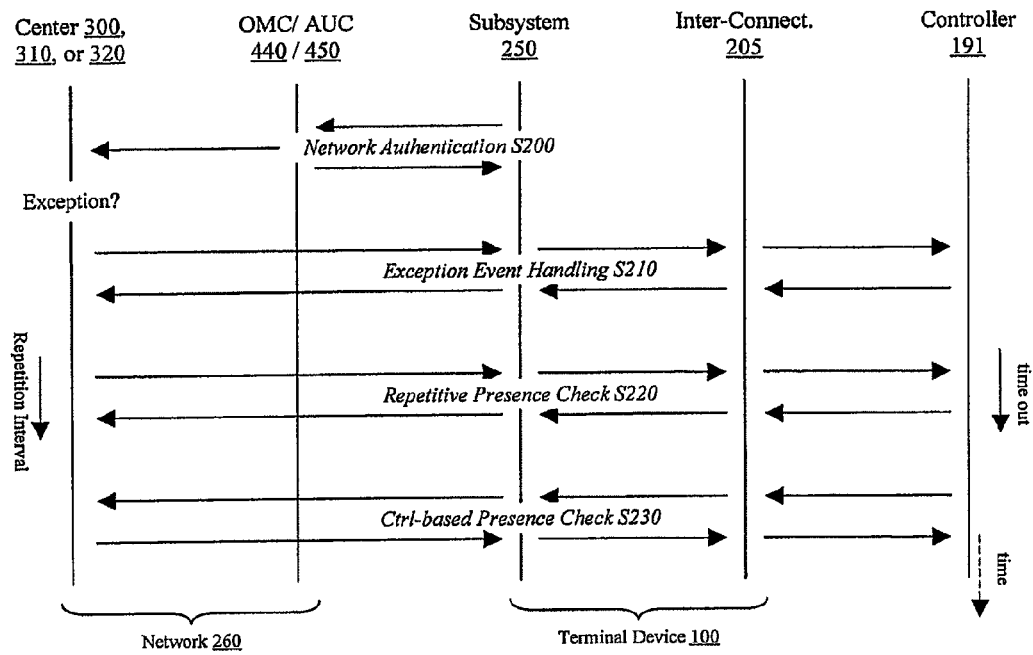
FIGS. 5a to 5c illustrate schematically time flow message charts depicting message exchange between entities of the system of FIG. 4a or 4b according to embodiments of the present invention.
Figure 5B:
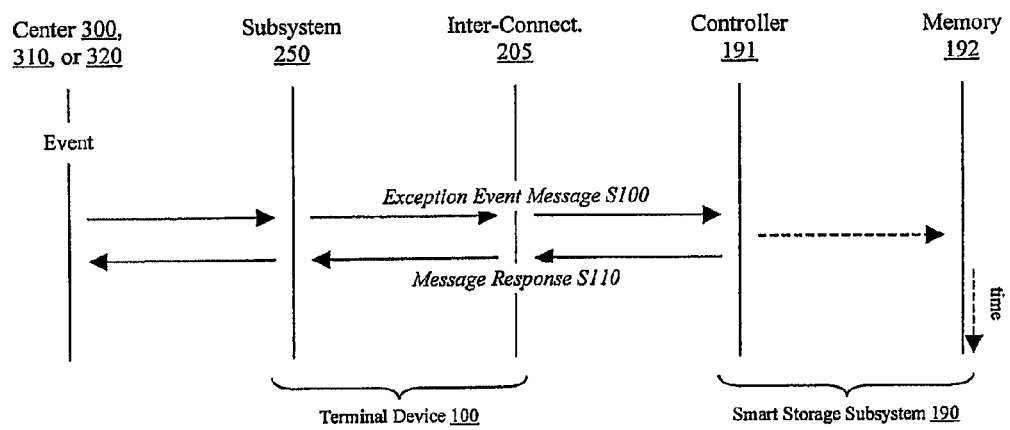

Reference should be given to FIG. 5a. Typically, the subscription of a terminal device 100 capable for network connectivity to any public and/or private network infrastructure requires registration and authentication of the terminal device 100 thereon such that the network operator is capable to control the access to its network, to charge for its network service, to allow network operation, network configuration, network performance management and security management.

The registration and authentication is typically operable with registration and authentication centers; e.g., in view of a GSM network the registration is operable with location registers (Home Location Register and/or Visitor Location Register), whereas the authentication is operable with the Authentication Center (AUC) 450 being part of the Operation and Maintenance Subsystem controlled trough the Operation and Maintenance Center (OMC) 440.

The terminal device 100 authenticates towards the network at least each time the terminal device is subscribed thereto; i.e., each time the network connectivity subsystem 180 of the terminal device 100 is registered to the network such that data communication with the network is operable. The subscription is at least performed each time the network connectivity subsystem 180 and the terminal device 100 is put into operation, respectively.

Upon registration, an authentication entity such as the Authentication Center (AUC) 450 is accessed, which stores information about the subscriber identification and subscriber authentication as well as device registrations, sensible/personal data and (cipher) keys. The (cipher) keys enable performing subscriber authentication and authorization of services provided by the network. The authentication may be performed in at start-up of the network connectivity subsystem 250, at predefined points in time, and/or at any predefined (regular or irregular) intervals during (normal) operation of the network connectivity subsystem 250. The network connectivity subsystem 180 of the terminal device comprises a network authentication module, which interoperates with the authentication entity for authentication. For example, cellular terminal device comprise a SIM (Subscriber Identification Module) such as the STM 185 of terminal device 100, which enables the authentication against authentication information stored at the Authentication Center (AUC) 450. The authentication may be based on a request-response challenge communication, which is performed to ensure that even in case an unauthorized party eavesdrop the communication exchanged secrets are not extractable from the eavesdropped communication.

Upon authentication, such as operation S200, which is illustratively shown in FIG. 5a, a check for one or more exceptions is operable, where the exceptions are provided by the application service provider (ASP), preferably through the Application Service Provider (ASP) Center 310. The Secure Storage Maintenance (SSM) Center 320 is informed by the Application Service Provider (ASP) Center 310 about the one or more exceptions. During authentication the authentication entity, e.g., the Authentication Center (AUC) 450, informs the Secure Storage Maintenance (SSM) Center 320, which may comprise a fraud management function, about the authentication operation including especially an indication about a successful authentication. Upon indication of the authentication entity the Secure Storage Maintenance (SSM) Center 320 checks whether one or more exceptions concerning the secure storage subsystem 190 of the terminal device 100 are present. In case such an exception is identified by the Secure Storage Maintenance (SSM) Center 320 to be processed, the Secure Storage Maintenance (SSM) Center 320 is operable to initiate communication with the secure storage subsystem 190 of the terminal device 100. The communication between the Secure Storage Maintenance (SSM) Center 320 and the secure storage subsystem 190 is operable through the network connectivity subsystem 250 and the interconnectivity component 205. Such communication may comprise a request-response communication including one or several requests directed to the secure storage subsystem 190 and the secure storage controller 191 thereof as well as one or several responses from the secure storage subsystem 190 and the secure storage controller 191 thereof back to the Secure Storage Maintenance (SSM) Center 320.

For instance, an exception may be defined in consequence of a call by the user to the application service provider (ASP) requiring the close of the application (cancelling of the application service provided by the ASP, e.g., in case of loss of the terminal device 100 or in response to expiration), an initialization of the application and/or upload/modification of data stored by the secure storage subsystem 190. Moreover an exception may be defined on initiative of the application service provider (ASP), e.g., to enable automatic notification of recharging, (temporarily) blocking of the use of an application service due to user account balance, and the like.

With reference to operation 5210, one or more messages are transmitted by the network to the network connectivity subsystem 250 of the terminal device 100; the messages preferably originate from the Secure Storage Maintenance (SSM) Center 320. The messages are supplied to the interconnectivity component 205, which detects that the messages are intended to terminate at the secure storage subsystem 190 and the secure storage controller 191 thereof. Upon detection, the messages are supplied by the interconnectivity component 205 to the secure storage controller 191, which is instructed by one or more commands included in the messages to perform commanded operations; e.g., disabling/blocking an application service enabled by the secure storage subsystem 190, initializing an application service enabled by the secure storage subsystem 190, removing/deleting/modifying data stored in the secure storage memory 192 and the like. The secure storage controller 191 may transmit back one or more responses which may include reception acknowledgement and/or command result information. In particular, the information about command result may comprise information about the success of commands performed and/or data obtained in reaction to performing commands.

Preferably, the messages transmitted through the network and terminating at the secure storage subsystem 190 are cryptographically secured to ensure inter alia privacy, integrity, and/or authenticity. Correspondingly, the messages may be ciphered and are provided with a digital signature and/or a certificate. The ciphering ensures privacy, whereas the digital signature enables for integrity, and/or authenticity verification. The cryptographic protection of the messages is preferably based on a public key ciphering infrastructure as known in the art.

The deciphering mechanisms implementing deciphering of the ciphered messages and/or verification of digital signatures and/or certificates may be implemented in the interconnectivity component 205 or the secure storage controller 191. Cryptographic keys, signatures, and/or certificates may be provided by the secure storage controller 191 and may be stored in the secure storage memory 192.

The check whether one or more exceptions are present on network side may be set in accordance with the requirements of the application service provider and/or the network operator. The exception check may be performed inter alia at least at the point of time of initial authentication of the network connectivity subsystem 250 (at start-up), at any predefined points in time, and/or at any (regular or irregular) intervals during operation.

Furthermore, the application service provider (ASP) may require that one or more regular acknowledgements are sent to the secure storage subsystem 190 in order to assure that the secure storage subsystem 190 cannot be used in local communication too long in the power off-mode.

Such an acknowledgement check could be based on a request-response communication imitated by the Secure Storage Maintenance (SSM) Center 320 such as operation 5220 of FIG. 5a and/or the acknowledgement check could be based on a request-response communication imitated by the secure storage subsystem 190 such as operation 5240 of FIG. 5a.

The acknowledgement check may be operated inter alia at any predefined points in time, and/or at any (regular or irregular) intervals during operation. Moreover, the acknowledgement check may be operated inter alia in response to a predefined number of operations of the secure storage subsystem 190 through the local RF connectivity subsystem 193, a predefined number of transactions performed by the secure storage subsystem 190, transaction limits defined for transactions performed by the secure storage subsystem 190, and the like.

In case such an acknowledgement check fails, which may include that the acknowledgement is not available at one of the aforementioned check requirements or the acknowledgement itself indicates failure, the secure storage subsystem 190 or an application service operable with the secure storage subsystem 190 may be (temporality and/or permanently) blocked or disabled. A blocked or disabled secure storage subsystem 190 or an application service operable with the secure storage subsystem 190 may be re-enabled in reaction to a successful acknowledgement check or the re-enablement may require a specific message to be received through the network 260.

Disabling Procedure

In general, the basic concept of the present invention allows application service provider and/or network operator to exercise control over the secure storage subsystem 190. In particular, the control over the secure storage subsystem 190 includes disabling of the secure storage subsystem 190. For instance in view of a transaction service issuer (such as a credit card issuer, a payment card issuer, etc.) the possibility of disabling (payment) transaction services operable with the secure storage subsystem 190 is a critical issue. A disabling may be required in case a (contactless) smart card (forming the secure storage subsystem 190) or the terminal device 100 comprising the secure storage subsystem 190 reported lost or stolen. Further, a disabling may be required in case of some kind of indication relating to possible misuse of the secure storage subsystem 190. Typically, such disabling of the secure storage subsystem 190 may require reconfiguration of the secure storage subsystem 190 that may require inputting rebooting type of information to the secure storage subsystem 190 that cannot be done without having access to highly sensitive information that is typically accessible only to application service providers.

As aforementioned, an application service provider (ASP) can define exception events at the Secure Storage Maintenance (SSM) Center 320. The Secure Storage Maintenance (SSM) Center 320 is a trustworthy network entity at which such highly sensitive information can be provided by the application service provider (ASP). In addition to the aforementioned check for exceptions at the Secure Storage Maintenance (SSM) Center 320, preferably at predefined points in time and/or intervals in time, the Secure Storage Maintenance (SSM) Center 320 may be configured to react promptly on important exception events such as requirements for disabling. Consequently, such an exception is to be processed promptly.

With reference to operation 5100, the Secure Storage Maintenance (SSM) Center 320 generates a message in accordance with the exception event, herein for instance a message containing instructions to disable the secure storage subsystem 190 and an application service operable with the secure storage subsystem 190, respectively, and transmits the message to the secure storage subsystem 190 and the secure storage controller 191 thereof, respectively.

The disabling message may also instruct the terminal device 100, the communication controller 200 thereof, the secure storage subsystem 190, or the secure storage controller 191 thereof to reply to the message when the message is received. The response to the message may be transmitted back to the Secure Storage Maintenance (SSM) Center 320, which then may inform application service provider (ASP) by an acknowledgment message to the Application Service Provider (ASP) Center 310 or the network operator by an acknowledgment message to the Network Provider Control (ASP) Center 300. Alternatively, the response may be transmitted directly to the application service provider (ASP) or the network operator.

The messages transmitted from the Secure Storage Maintenance (SSM) Center 320 to the secure storage subsystem 190 through the network 260, the network connectivity subsystem 180 and the interconnectivity component 205 may be some sort of dedicated "smart" Short Messages or Multimedia Messages in accordance with the corresponding Short Message Service and Multimedia Message Service supported by today's cellular network. Such "smart" messages should be understood to include an indication the message is directed to the secure storage subsystem 190 and the terminal device 100 and the interconnectivity component 205, upon receiving such a message, processes the message without displaying it to the user. In particular, "smart" messages may employ the SMS message Toolkit functionality provided by SIMs (Subscriber Identification Modules) operated in cellular terminal devices. In general, the SMS message Toolkit functionality enables a SIM such as the SIM 185 of the terminal device 100 to drive the terminal device 100, build up an interactive exchange between a network application and the terminal device 100 and access or control access to the network 260. The SIM has a proactive role in the terminal device 100 and is configured to initiate commands independently of the terminal device 100 and the network 260.

Reload & Update Procedures

It should be assumed that a user may, from time to time, switch the secure storage subsystem 190 between different terminal devices. The concept of the present invention enables a reloading of relevant application related code sections, i.e., program code and/or user interface definitions, which may be required in reaction to the exchange between different terminal devices having different processing capabilities and functionalities and underlying different constraints.

For instance, the network operator identifies a changed user identifier and terminal device identifier combination in consequence of the device exchange. Upon detection of the change of the identifier combination, a status message is generated by the Application Service Provider (ASP) Center 310 and the Secure Storage Maintenance (SSM) Center 320, respectively, which comprises inter alia desired configuration status information of the secure storage subsystem 190 and/or one or more application services operable with the secure storage subsystem 190. The status message is transmitted through the network 260 to the secure storage controller 191, which compares the desired configuration status information with current configuration status information obtained by the secure storage controller 191. The configuration status information comprises in particular status information about program code and/or user interface definitions required for operating application services by the means of the secure storage subsystem 190.

In case the secure storage controller 191 identifies differences between the current configuration status and the desired configuration status, a request message is generated by the secure storage controller 191 and transmitted via the network 260 to the originator of the status message. The request message should be responded by a reload message, which may comprise data required to achieve the desired configuration status. In particular, the reload message may comprise information enabling the secure storage controller 191 to download required data through the _____ network 260. The download information may comprise a network address such as a URL (Uniform Resource Locator) or URI (Uniform Resource Indicator) and/or access information such as account identifier and/or account password.

It should be noted that the aforementioned process may be also initiated by the secure storage controller 191. Independently of the detection, the secure storage controller 191 may generate a message, which comprises a request for the desired configuration status information. The message is supplied to the interconnectivity component 205 for transmission over the network 260 to be sent to the Application Service Provider (ASP) Center 310 or to the Secure Storage Maintenance (SSM) Center 320. In reaction to this message, the addressee generates the requested desired configuration status information, which is transmitted back to the secure storage controller 191. Alternatively, the secure storage controller 191 may generate a network message, which comprises current configuration status information obtained by the secure storage controller 191. The addressee, i.e., the Application Service Provider (ASP) Center 310 or to the Secure Storage Maintenance (SSM) Center 320, compares the received current configuration status information with desired configuration status information. On the basis of differences between the current configuration status and the desired configuration status, a reload message is generated by the addressee any transmitted to the secure storage controller 191.

The user of the terminal device 100 may have to confirm the initiation of a network data download.

In analogy to the aforementioned exchange procedure, a comparable procedure is operable when new application related code sections have to be updated for instance due to new versions, new application services, and the like.

Upon initiation of the secure storage controller 191, the secure storage controller 191 may generate a message, which comprises a request for the desired configuration status information.

The message is supplied to the interconnectivity component 205 for transmission over the network 260 to be sent to the Application Service Provider (ASP) Center 310 or to the Secure Storage Maintenance (SSM) Center 320. In reaction to this message, the addressee generates the requested desired configuration status information, which is transmitted back to the secure storage controller 191. Alternatively, the secure storage controller 191 may generate a network message, which comprises current configuration status information obtained by the secure storage controller 191. The addressee, i.e., the Application Service Provider (ASP) Center 310 or to the Secure Storage Maintenance (SSM) Center 320, compares the received current configuration status information with desired configuration status information. On the basis of differences between the current configuration status and the desired configuration status, a reload message is generated by the addressee any transmitted to the secure storage controller 191.

Moreover, the Application Service Provider (ASP) Center 310 or to the Secure Storage Maintenance (SSM) Center 320 may generate a message comprising desired configuration status information at any one or more points in time or in regular or irregular intervals. On the basis of the received configuration status information the secure storage controller 191 checks the configuration status of the secure storage subsystem 190.

Similarly the reload message from the network 260 could indicate a desired configuration state in consequence to which a component comprising code sections is downloaded, which enable to remove application related code sections, i.e., program code and/or user interface definitions. The removal may be for instance instructed when the corresponding application has expired.

Likewise, application related code sections may be removed without requiring a component downloaded over the network.

Those skilled in the art will appreciate on the description above that the aforementioned procedures relating to updating and/or downloading are also applicable to update and/or download application related contents.

Removal Procedure

With reference to the verification and/or disabling procedures described above, the Application Service Provider (ASP) Center 310 or to the Secure Storage Maintenance (SSM) Center 320 may generate a request message directed to the secure storage controller 191, which instructs the secure storage controller 191 to remove application related contents from the secure storage memory 192 and imitate removing of application related code sections, i.e., program code and/or user interface definitions, which are associated with the application related contents to be removed.

Those skilled in the art will appreciate that the complete removal of data relating to an application service (where the data comprise application related contents and/or application related code sections) is especially applicable in conjunction with a disabling or blocking of the respective application service. In particular, the removal procedure will ensure that the, application service cannot be re-activated against without approval of the application service provider (ASP). In order to re-activate the application service, an update procedure may be operable, which requires the interaction of the application service provider (ASP).

Exchange Procedure

It should be assumed that a user may change the network authentication module and the secure storage subsystem 190 is fixedly associated with the network authentication module. For example, the user may change the SIM 185 of the terminal device 100 and the secure storage subsystem 190 is fixedly associated to a specific SIM 185 e.g., the former SIM. A methodology to associate the secure storage subsystem 190 to a specific SIM will be described below in detail. The fixed association guarantees that the secure storage subsystem 190 is only operable in case the respective SIM (to which the secure storage subsystem is associated) is present in the terminal device 100. In all other cases the secure storage subsystem 190 is not operable.

As aforementioned, the terminal device 100 and its network connectivity subsystem 250 authenticates against the authentication entity of the network by the means of the network authentication module. Upon authentication, the Secure Storage Maintenance (SSM) Center 320 may be informed about the authentication. The user can be identified by a subscriber identifier (ID) which is the same for the former and the new network authentication module.

The aforementioned reload procedure is applicable to reload the application related contents and application related code sections to a new secure storage subsystem which is associated to the new network authentication module. However, the application service provider (ASP) may be required to make provisions on the network side to enable the reload procedure upon detection of an exchange of the network authentication module. Moreover, the reload procedure may be alternatively imitated by the application service provider (ASP), e.g., through the Secure Storage Maintenance (SSM) Center 320 or the Application Service Provider (ASP) Center 310. The reload procedure may be enabled on information by the user or proactively by the application service provider (ASP).

Association Procedure

The operability of the secure storage subsystem 190 may be linked to the network authentication module to prevent usage of the secure storage subsystem 190 with any other network authentication module and to provide additional control by the cellular network operator over the operability of the secure storage subsystem 190.

The first case relates to a situation where an unauthorized (hostile) party might try to operate the terminal device 100 with the secure storage subsystem 190 by including a new network authentication module into the terminal device 100. For example, an unauthorized (hostile) party (such as a thief) might try to operate the terminal device 100 with the secure storage subsystem 190 by including a new SIM into the terminal device 100. Due to the fact that during authentication of the terminal device against the authentication entity of the network 260 the addressability of the terminal device 100 through the network 260 is defined, the terminal device 100 having a new network address cannot receive messages from the Secure Storage Maintenance (SSM) Center 320 as well as the Application Service Provider (ASP) Center 310 because these messages are still addressed in accordance with the former network authentication module. Typically, the network authentication module comprises a subscriber identifier on the basis of which the network address information such as a telephone number, an JP address and the like, is obtained. With reference to cellular networks, the telephone numbers are retrieved from the Home Location Register, which stores telephone numbers in association with subscriber identifiers. The misuse of the secure storage subsystem 190 with a replacement network authentication module is not possible due to the association of the secure storage subsystem 190 and the network authentication module. The latter case relates to the desire of a network operator to control their customers, because the network operator may bind the usage of the secure storage subsystem 190 to the network authentication module so that if a user wants to change the network operator or give the secure storage subsystem 190 (in case the subsystem is detachable) to a friend or like, the operation of the is secure storage subsystem 190 prevented due to the association of the secure storage subsystem 190 and the network authentication module.

However, in cases where the user wants to place the detachable secure storage subsystem 190 to another terminal device that is owned by the same user (same or different network authentication module, but links to same user account), the authentication may be performed successfully as there is no contradictions between the user account and the secure storage subsystem 190.

In general, the secure storage controller 191 of the secure storage subsystem 190 can request an authentication of the network authentication module (e.g., the SIM 185) of the network connectivity subsystem 180 of the terminal device 100. The request for authentication is preferably preformed prior to any operation of the secure storage subsystem 190. In that way, the network identification module (e.g., SIM 185) and the secure storage subsystem 190 cannot be separated.

Figure 5C:
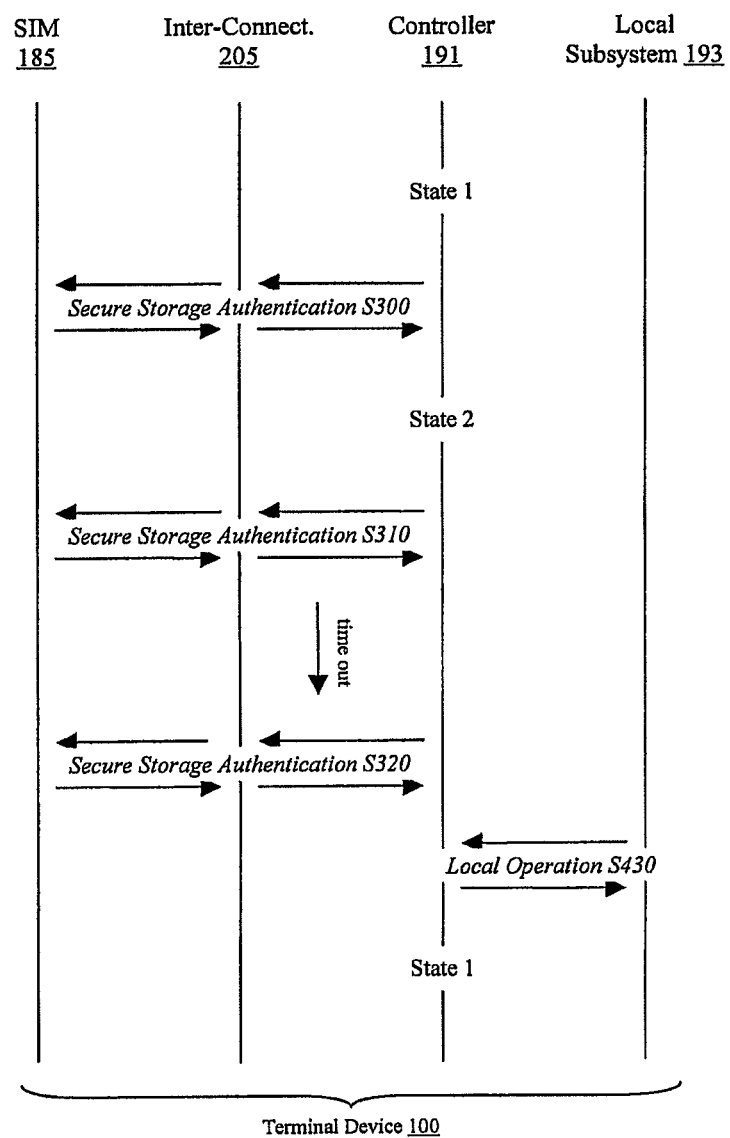

With reference to FIG. 5c, the secure storage controller 191 operating a management application may have two operational states:

The first operational state (State 1) is active when the secure storage subsystem 190 is not (yet) mutually authenticated with the network authentication module. The operation of the secure storage subsystem 190 is disabled; in particular any operation of the secure storage subsystem 190 through the local RF connectivity subsystem 193 is disabled. In this operational state the secure storage subsystem 190 may perform in accordance with a defined algorithm, e.g., with fixed intervals, on power-on, and/or any other triggers, requesting authentication from the network authentication module (SIM 185). This mutually authentication may be based on a public key infrastructure or a challenge-response algorithm. Once the mutual authentication (operation S300) has been confirmed the secure storage subsystem 190 and the secure storage controller 191 switches to the second operation state (State 2), respectively.

During second operation state (State 2), the secure storage subsystem 190 as well as the secure storage controller 191 is mutually authenticated with the network authentication module and local RF connectivity is operable with the secure storage subsystem 190 through the local RF connectivity subsystem 193. This second operational state (State 2) may require repetitive mutual authentication procedures (operations 5310 and 320), i.e., in any (regular or irregular) intervals of time. This means that after passing of predefined time-out periods the secure storage subsystem 190 and the secure storage controller 191 switches automatically to the first operation state (State 1), respectively. Moreover, the repetitive mutual authentication procedures may be required after each local RF communication of the secure storage subsystem 190 through the local RF connectivity subsystem 193. This means, the secure storage subsystem 190 and the secure storage controller 191 switches automatically (operation 5430) to the first operation state (State 1), respectively, after a local RF communication of the secure storage subsystem 190.

The authentication keys and/or authentication algorithms are preferably loaded into the secure storage controller 191 and the network authentication module (SIM 185) at the time of set-up.

The information exchange required during a mutual authentication procedure can be performed through a direct connection of the secure storage controller 191 and the network authentication module (SIM 185) or through the baseband of the network connectivity subsystem 180 via the communication controller 200.

In case of direct connection the secure storage controller 191 may exchange information directly with the network authentication module (SIM 185). An authentication software and/or hardware protocol implemented enables the mutual authentication procedure.

In the latter case, the secure storage subsystem 190 should be able to initiate an interrupt to the communication controller 200 or the communication controller 200 may poll the secure storage subsystem 190 on regular intervals. Once the communication controller 200 has the information that a network identification module (SIM 185) is to be authenticated a specific application on the network identification module (SIM 185) may be requested to respond to this authentication request. The communication controller 200 supplies the response to the authentication request to the secure storage controller 191 as a response to its query. If the response is satisfactory the secure storage controller switches to the second operational state where local RF communication is enabled.

Those skilled in the art will appreciate from the description above being based on different embodiments that operational state of the secure storage subsystem 190 can be controlled through the network by authorized network entities without any need for the user to take action. The concept of the present invention also enables the authorized network entities to define a solution, which allows controlling distribution of messages to the terminal devices. In this way the authorized network entities can ensure complete control of the application operable with the secure storage subsystem 190. This means in particular that the network operator enabling secure storage maintenance by the means of a Secure Storage Maintenance (SSM) Center can define the messages, e.g., SIM toolkit messages, as well as the frequency of exception control, in order to optimize network usage and load.

It will be obvious for those skilled in the art that as the technology advances, the inventive concept can be implemented in a broad number of ways. The invention and its embodiments are thus not limited to the examples described above but may vary within the scope of the claims.

What is claimed is:

1. An apparatus, comprising
a communication controller including a physical interconnectivity interface configured to enable communication between a secure storage subsystem and a network entity external to the apparatus, through a network connectivity subsystem configured to provide for data connectivity through a wireless communication network;
wherein said communication controller is configured to:
detect that one or more messages received through the network connectivity subsystem are destined for said secure storage subsystem, wherein said secure storage subsystem comprises one of a plurality of possible destinations in the apparatus; and
in an instance in which the secure storage subsystem has been authenticated with the network entity, supply said one or more messages to said secure storage subsystem, wherein said one or more messages enable exercising control over said secure storage subsystem in that said one or more messages comprise one or more instructions to be processed by a secure memory controller of said secure storage subsystem.

2. An apparatus according to claim 1, wherein said communication controller is further configured to receive messages generated by said secure memory controller and to supply said received messages to said network connectivity subsystem for transmission to the network entity through said wireless communication network.

3. An apparatus according to claim 1, wherein said one or more messages received from said wireless communication network originate from a secure storage maintenance center arranged in said wireless communication network or said received messages generated by said secure memory controller are destined for said secure storage maintenance center.

4. An apparatus according to claim 1, wherein said one or more messages received from said wireless communication network comprise commands relating to the operability of the secure storage subsystem or commands relating to modifications of content stored in a secure storage memory of said secure storage subsystem.

5. An apparatus according to claim 1, wherein a disablement message from said wireless communication network is received in response to an exception event requiring disabling of at least one local application service operable with said secure storage subsystem, wherein upon reception of said disablement message, said secure memory controller is configured to at least temporarily disable said local application service.

6. An apparatus according to claim 1, wherein the network entity is operable to authenticate said network connectivity subsystem at said wireless communication network, wherein said network connectivity subsystem is allowed for data connectivity with a network after authentication at said wireless communication network; and wherein said secure storage subsystem is configured to mutually authenticate with said network entity.

7. An apparatus according to claim 1, wherein said communication controller is configured to supply said one or more messages to said secure storage subsystem in an instance in which said secure storage subsystem has been mutually authenticated with said network entity.

8. An apparatus according to claim 1, wherein said network connectivity subsystem is a wireless network connectivity subsystem or a cellular network connectivity subsystem.

9. An apparatus according to claim 1, wherein said secure storage subsystem is a contactless smartcard module or said secure storage subsystem comprises a secure memory connected to a local radio frequency connectivity subsystem configured for radio frequency communication in accordance with any contactless technology.

10. An apparatus according to claim 1, wherein said secure storage subsystem is connected to a wireless near field communication interface such that the secure storage subsystem is usable in connection with contactless payment and ticketing.

11. A method comprising:
receiving one or more messages from a wireless communication network via a network connectivity subsystem configured for data connectivity with said wireless communication network;
detecting, by a communication controller including a physical interconnectivity interface, that the one or more messages are destined for a secure storage subsystem, wherein said secure storage subsystem comprises one of a plurality of possible destinations in an apparatus, wherein said secure storage subsystem is associated with at least one network entity external to the apparatus; and
in an instance in which the secure storage subsystem has been authenticated with the at least one network entity, supplying, by the communication controller, said one or more messages to said secure storage subsystem, wherein said one or more messages enable exercising control over said secure storage subsystem, wherein the one or more messages comprise one or more instructions to be processed by a secure memory controller of said secure storage subsystem.

12. A method according to claim 11, wherein said one or more messages received from said network comprise commands relating to the operability of the secure storage subsystem or commands relating to modifications of contents stored in said secure storage memory of said secure storage subsystem.

13. A method according to claim 12, wherein said commands relating to modifications of said stored contents comprises commands relating to modifications of application related contents or commands relating to modifications of application related code sections including program code or user interface definitions.

14. A method according to claim 11, wherein a disablement message from said wireless communication network is received in response to an exception event requiring disabling of as least one local application service operable with said secure storage subsystem, wherein upon reception of said disablement message, said secure memory controller disables at least temporarily said local application service.

15. A method according to claim 11, further comprising:
mutually authenticating said secure memory subsystem with the network entity;

wherein said network entity is provided to authenticate said network connectivity subsystem at said wireless communication network, wherein said network connectivity subsystem is allowed for data connectivity with the wireless communication network after authentication at said wireless communication network.

16. A method according to claim 11, wherein supplying said one or more messages to said secure storage subsystem is performed in an instance in which said secure storage subsystem has been mutually authenticated with said network entity.

17. A method device according to claim 11, wherein said network connectivity subsystem is a wireless network connectivity subsystem or a cellular network connectivity subsystem.

18. A method according to claim 11, wherein said secure storage subsystem is a contactless smartcard module or said secure storage subsystem comprises a secure memory connected to a local radio frequency connectivity subsystem configured for radio frequency communication in accordance with any contactless technology.

19. A method according to claim 11, wherein said secure storage subsystem is connected to a wireless near field communication interface such that the secure storage subsystem is usable in connection with contactless payment and ticketing.

20. A computer program product comprising program code sections stored on a non-transitory machine-readable medium that, when executed, cause a communication controller including a physical interconnectivity interface to carry out the operations of claim 11.

* * * * *